April 15, 1930.  E. W. STEVENS  1,754,408
PROCESS AND APPARATUS FOR SEPARATING METALLIC VALUES
Filed Dec. 20, 1929
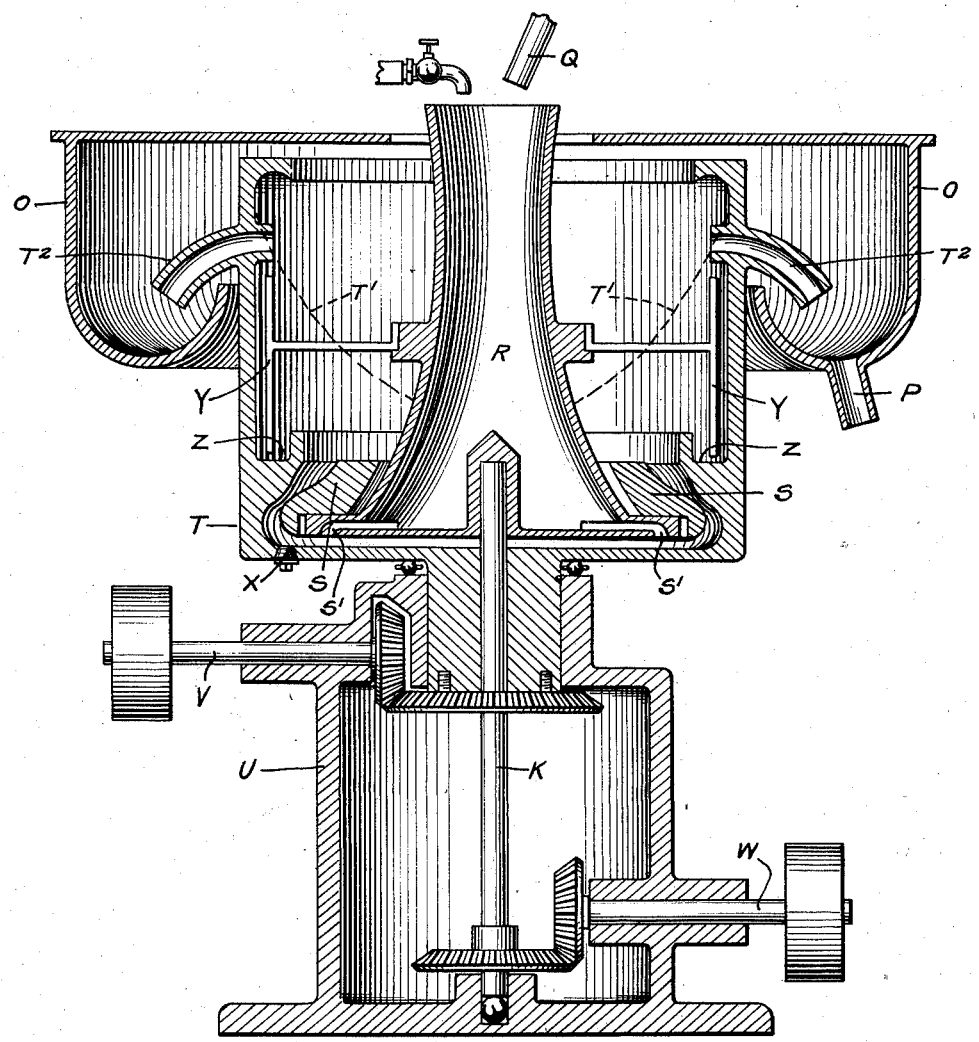
Inventor
*ELBRIDGE W. STEVENS.*
By Albert Grobstein
Attorney Patented Apr. 15, 1930

1,754,408

UNITED STATES PATENT OFFICE

ELBRIDGE WEBSTER STEVENS, OF BALTIMORE, MARYLAND

PROCESS AND APPARATUS FOR SEPARATING METALLIC VALUES

Application filed December 20, 1929. Serial No. 415,435.

This invention relates to the extraction of gold and other precious metals from their native ores, and particularly from ores or other materials where the metallic values are of small particle size, or where they occur mixed with materials having high surface adhesive values, such as acid magnesium metasilicates of the nature of $H_2Mg_3(SiO_3)_4$, thinly cleavable fine grain metamorphic rocks formed in part from shales, mixtures of hydrous aluminum silicates with feldspar or quartz, and other such materials. Satisfactory separation of heavy and valuable metallic constituents from such highly adhesive materials has heretofore been commercially impracticable because of the difficulties involved. In sepiolitic ores, for example, gangue material composed in large part of $H_4Mg_2Si_3O_{10}$ may constitute as much as 70% of the ore, and the metallic particles of gold, silver or platinum contained therein, though free milling, are of such fineness as to be nondiscernible with the naked eye.

I have discovered that efficient separation of such noble metals can be economically effected by treatment of the materials containing them in a finely divided or colloidal condition with the application of certain physical forces resulting from Venturi nozzles, and/or centrifugal force.

My preferred method of operation is with the use of the novel apparatus hereinafter described and with the application of centrifugal force, but the invention is not limited to the specific apparatus, as any apparatus embodying the Venturi nozzle effect, or the equivalent of centrifugal force together with the Venturi nozzle effect, are within the scope of the invention.

The accompanying figure shows a centrifugal separator in elevation and cross-section. It comprises a feeder R fixed to rotate with the shaft K, geared to the pulley shaft W; a bowl T rotatably supported on base U, and geared to pulley shaft V. The feeder nozzles S are supported by feeder R and are horizontally adjustable with respect to the curved inner wall of the bowl T so that the space between can be varied as required in accordance with the changes in fineness of gangue or changes in character of ores used. While the adjustment is shown as horizontal, it is apparent that vertical adjustment or any other relative adjustment of what I term a "Venturi space" can be arranged. This space between the curved nozzle feeder S and the curved wall of the bowl T is in the shape of a circular vertical venturi, with the top of the cross-section of the same bending back toward the center of the machine. Attached to the central portion of the feeder R are the wings Y, extensions of which rotate within the channel Z. Outlets $T^2$ are shown adjacent the collector ring O, which has a discharge pipe P. Plug opening X is provided at the base of the bowl T.

In operation, properly classified material, preferably in colloidal suspension, enters the feeder R through the conduit Q. The feeder is rotated at a speed varying from 10 R. P. M. to 100 R. P. M., or more or less as required by the exigencies of the particular situation. The bowl T is independently rotated in the same direction as that of the feeder R, but at about 100 R. P. M. to 250 R. P. M. The solution flows out of the bottom of the feeder through passages $S^1$ into the circular Venturi space, and then upward into the bowl where it takes a position shown by the dotted lines $T^1$.

The passage of the suspended solution through the Venturi nozzle under centrifugal conditions subjects the same to violent agitation which is caused by a summation of forces comprising fluid friction resulting from differential rotation of speeds of feeder and bowl, centrifugal force of rotation, and Venturi forces resulting from passage through the graduated increasing surface areas of the Venturi nozzle. This latter force of the venturi is important and especially so in the fact that the backward curvature of the venturi toward the center of the bowl permits the heavier metallics to drop at the point of greatest circumference of the inner wall of T and permits the lighter gangue particles to be subject to less centrifugal force after entrance to the secondary treatment section in the upper part of the bowl. In this way, I have overcome a serious defect which is characteristic of other centrifugal metal separation machines, because such machines have shown a tendency for the lighter particles of the gangue to pack against the inside vertical wall of the bowl along with the heavier metallics contained in the original ore, and the fresh metal particles entering could not break through this packed mass, with the result that both heavier and lighter particles would wash over the inner packed surface and pass through the receptacle with little or no separation.

As will be readily understood, the wings Y prevent packing in the upper section of the bowl, and the outlets $T^2$ lead to the collector ring O and tailings disposal pipe P. Mercury may be placed in the lower bowl at the place of greatest diameter, and also in the channel Z. The values may be "cleaned" through the plug X. Additional water may be added as desired to the material fed into feeder R, and other operating details may be adjusted or controlled by those skilled in the art.

I claim:—

1. The process of separating heavy metallic particles from a colloidal solution which comprises centrifuging the same through an annular vertical Venturi nozzle.

2. The process of separating particles of different specific gravities from a colloid suspension which comprises passing substantially all of the suspension through a Venturi nozzle under conditions of fluid friction caused by differential speeds of rotation of the members comprising the Venturi nozzle.

3. In a centrifugal separator for recovering metallic values, the combination of a feeder, a rotative bowl and a Venturi nozzle therein through which material may pass from the feeder into the bowl.

4. In a machine of the class described, the combination of two concentric rotatably mounted elements, and additional means between the elements adapted to form a Venturi nozzle, said nozzle being between the additional means and one of the first named elements.

5. In combination, a rotative bowl, a feeder, and means supported by the feeder adapted to cooperate with the inner surface of the bowl to form a Venturi-shaped opening.

6. In a centrifugal separator, the combination of two members adapted for relative rotary movement comprising a bowl having upper and lower channels, and a feeder, means on the feeder permitting discharge into the bowl, means supported by the feeder cooperating with a lower channel of the bowl, and additional means supported by the feeder cooperating with an upper channel of the bowl.

7. In an ore separating machine, a bowl, a feeder having a double concave shaped cross-section within the bowl, means for varying the speed and direction of rotation of each of these elements independently of each other while the machine is in operation.

8. As an element in a centrifugal separator, a circular feeder having supported thereon a horizontally adjustable exterior rim lying in a plane substantially parallel to the base of the feeder.

In testimony whereof, I have hereunto set my hand.

ELBRIDGE W. STEVENS.